(12) United States Patent
Bucher et al.

(10) Patent No.: US 9,902,212 B2
(45) Date of Patent: Feb. 27, 2018

(54) LIGHTER HYBRID BEAD WIRE FOR TYRE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Laurent Bucher, Clermont-Ferrand (FR); Jean-Michel Huyghe, Clermont-Ferrand (FR); Antonio Delfino, Clermont-Ferrand (FR); Jean-Paul Meraldi, Clermont-Ferrand (FR); Thibault Rapenne, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 565 days.

(21) Appl. No.: 14/405,020

(22) PCT Filed: Jun. 5, 2013

(86) PCT No.: PCT/EP2013/061587
§ 371 (c)(1),
(2) Date: Dec. 2, 2014

(87) PCT Pub. No.: WO2013/182599
PCT Pub. Date: Dec. 12, 2013

(65) Prior Publication Data
US 2015/0144245 A1 May 28, 2015

(30) Foreign Application Priority Data
Jun. 7, 2012 (FR) ...................................... 12 55296

(51) Int. Cl.
*B60C 15/00* (2006.01)
*B60C 15/04* (2006.01)
(Continued)

(52) U.S. Cl.
CPC ............... *B60C 15/04* (2013.01); *D02G 3/36* (2013.01); *D02G 3/48* (2013.01); *D07B 1/0633* (2013.01);
(Continued)

(58) Field of Classification Search
CPC ............................... B60C 15/04; B60C 15/05
See application file for complete search history.

(56) References Cited

U.S. PATENT DOCUMENTS 1,757,156 A * 5/1930 Wirkkala ............... D07B 1/068
57/214
3,645,819 A * 2/1972 Fujii ...................... A63B 51/02
138/141
(Continued)

FOREIGN PATENT DOCUMENTS

DE       19 18 224 A1     7/1970
DE   10 2010 030 773 A1   1/2012
(Continued)

OTHER PUBLICATIONS

International Serach Report dated Aug. 16, 2013, for Application No. PCT/EP2013/061587.
(Continued)

*Primary Examiner* — Justin R Fischer
(74) *Attorney, Agent, or Firm* — Fitzpatrick, Cella, Harper & Scinto (57) ABSTRACT

A bead wire for a tire includes a core, an outer layer, and at least one intermediate layer. The core includes at least one yarn of a multifilament textile fiber embedded in an organic matrix. The outer layer includes an outer-layer metal wire
(Continued)

wound around the core. Each intermediate layer includes an intermediate-layer metal wire wound around the core. Each intermediate layer is disposed between the core and the outer layer.

18 Claims, 2 Drawing Sheets

(51) Int. Cl.
*D02G 3/36* (2006.01)
*D02G 3/48* (2006.01)
*D07B 1/06* (2006.01)
*B60C 1/00* (2006.01)

(52) U.S. Cl.
CPC ...... *D07B 1/0686* (2013.01); *B60C 2001/005* (2013.01); *B60C 2015/042* (2013.01); *B60C 2015/044* (2013.01); *B60C 2015/046* (2013.01); *D07B 2501/2053* (2013.01); *D10B 2101/20* (2013.01); *D10B 2505/022* (2013.01); *Y10T 152/10846* (2015.01)

(56) References Cited

U.S. PATENT DOCUMENTS

| | | | |
|---|---|---|---|
| 3,730,678 A | 5/1973 | Wedler et al. | 8/149.1 |
| 3,776,293 A | 12/1973 | Marzocchi | 152/359 |
| 4,436,132 A * | 3/1984 | Cesar | B29D 30/48 152/539 |
| 4,878,343 A * | 11/1989 | Weidenhaupt | D02G 3/48 152/451 |
| 4,887,422 A * | 12/1989 | Klees | D07B 1/025 57/216 |
| 6,571,847 B1 | 6/2003 | Ueyoko | 152/540 |
| 6,622,766 B1 | 9/2003 | Baldwin, Jr. | 152/540 |
| 6,875,297 B1 | 4/2005 | Meuwly et al. | 156/180 |
| 8,376,011 B2 * | 2/2013 | Ueyoko | B60C 3/04 152/531 |
| 2002/0043319 A1 | 4/2002 | Meraldi | 152/527 |
| 2003/0015827 A1 | 1/2003 | Hinc et al. | 264/479 |
| 2013/0118142 A1 | 5/2013 | Gommel et al. | D02G 3/02 |

FOREIGN PATENT DOCUMENTS

| | | |
|---|---|---|
| EP | 293263 * | 11/1988 |
| EP | 1 074 369 A1 | 2/2001 |
| EP | 1 167 080 A1 | 1/2002 |
| EP | 1 174 250 A1 | 1/2002 |
| EP | 1 657 081 A1 | 5/2006 |
| EP | 1 886 844 A1 | 2/2008 |
| EP | 2 179 869 A1 | 4/2010 |
| GB | 1072277 | 6/1967 |
| GB | 2372262 * | 8/2002 |
| WO | WO 2008/061544 A1 | 5/2008 |

OTHER PUBLICATIONS

D. Sinclair, "A Bending Method for Measurement of the Tensile Strength and Young's Modulus of Glass Fibers," Journal of Applied Physics, vol. 21, pp. 380-386 (May 1950).
U.S. Appl. No. 14/403,015, filed May 23, 2013, Barguet.
U.S. Appl. No. 14/403,029, filed May 23, 2013, Barguet.
U.S. Appl. No. 14/405,024, filed Jun. 5, 2013, Huyghe.
U.S. Appl. No. 14/405,033, filed Jun. 5, 2013, Huyghe.
"Micro-Alloyed Steel Cord Constructions for Tyres," No. 34984, Research Disclosure, pp. 333-344 (May 1993).
"High Tensile Strength Steel Cord Constructions for Tyres," No. 34054, Research Disclosure, pp. 624-633 (Aug. 1992).

* cited by examiner

Prior art

Fig. 4

LIGHTER HYBRID BEAD WIRE FOR TYRE

FIELD OF THE INVENTION

The invention relates to bead wires for tyres, in particular hybrid bead wires, that is to say those comprising at least two materials of different natures. It applies to any type of tyre for any type of vehicle.

RELATED ART

Conventionally, a tyre comprises two circumferential beads that are intended to allow the tyre to be fitted on the rim. Each bead comprises an annular reinforcing bead wire.

The prior art discloses a tyre for an aircraft, comprising a bead wire comprising a core and six layers of steel wires wound around the core. The core is made up of a steel monofilament. The monofilament is bent round on itself and its two ends are welded in order to form an approximately circular ring.

Such a bead wire has noteworthy mechanical properties, in particular force at break, but at the cost of a relatively high mass.

BRIEF DESCRIPTION OF EMBODIMENTS OF THE INVENTION

The invention has the aim of a light bead wire that has a high force at break.

To this end, one subject of the invention is a bead wire for a tyre, comprising:
- a core comprising at least one yarn of a multifilament textile fibre embedded in an organic matrix,
- at least one outer layer comprising an outer-layer metal wire wound around the core,
- at least one intermediate layer comprising an intermediate-layer metal wire wound around the core, said intermediate layer being disposed between the core and the outer layer.

The bead wire according to the invention is relatively light. Specifically, the nature of the material of which the core is made makes it possible to reduce the mass of the bead wire according to the invention by 10 to 40% compared with that of a bead wire with a metal core, while retaining its mechanical properties, in particular force at break, by virtue of the presence of the fibre(s).

By definition, a textile fibre is non-metallic. A multifilament textile fibre comprises elementary textile filaments that are arranged side by side and oriented in a substantially unidirectional manner. The elementary filaments are thus more or less parallel to one another, apart from the occasional overlap.

The textile fibre reinforces the organic matrix. Such a fibre is chosen for example from the group consisting of polyvinyl alcohol fibres, aromatic polyamide (or "aramid") fibres, polyamide-imide fibres, polyimide fibres, polyester fibres, aromatic polyester fibres, polyethylene fibres, polypropylene fibres, cellulose fibres, rayon fibres, viscose fibres, polyphenylene benzobisoxazole (or "PBO") fibres, polyethylene naphthenate ("PEN") fibres, glass fibres, carbon fibres, silica fibres, ceramic fibres, and mixtures of such fibres. Use will preferably be made of fibres chosen from the group consisting of glass fibres, carbon fibres and mixtures of such fibres. Preferably, the fibre is a glass fibre.

An organic matrix is understood to be any matrix comprising, by weight, more than 50%, preferably more than 75% and more preferably more than 90% organic material.

The organic matrix may contain minerals and/or metals that come from its manufacturing process, but also deliberately added mineral and/or metal additives. Thus, an organic matrix may be for example a thermosetting polymeric matrix, for example based on an unsaturated polyester, polyepoxide, a phenolic derivative or aminoplast, or else a thermostable polymeric matrix, for example based on cyanate, poly(bismaleimide), polyimide, polyamidoimide, or else a thermoplastic polymeric matrix, for example based on polypropylene, polyamide, saturated polyester, polyoxymethylene, polysulphone and polyethersulphone, polyether ketone and polyether ether ketone, polyphenylene sulphide, polyetherimide, or else thermoplastic or crosslinked elastomer, for example based on polyurethane, silicone or rubber or even an organic matrix that results from a mixture of these matrices.

Preferably, the organic matrix is thermoset, preferably crosslinked. It is for example a resin that is crosslinkable by ionizing radiation, such as for example ultraviolet-visible radiation, a beam of accelerated electrons or X rays. A composition comprising a resin that is crosslinkable by a peroxide may also be chosen, it being possible for the subsequent crosslinking then to be carried out, in due course, by means of applied heat, for example by the action of microwaves. Preferably, use is made of a composition of the type that can be cured by ionizing radiation, it being possible for the final polymerization to be triggered and controlled easily by means of an ionizing treatment, for example of the UV or UV-visible type. As crosslinkable resin, use is more preferably made of a polyester resin (i.e. based on unsaturated polyester) or a vinyl ester resin. Even more preferably, use is made of a vinyl ester resin.

In one embodiment, the core comprises a single yarn, and is preferably made up of a single yarn.

In one variant, the core forms a monolithic torus. The term "monolithic" is understood to mean that the torus has no discontinuities of material or joints on the macroscopic scale. Since the torus is monolithic, the core is less fragile than the core of the prior art bead wire, which has a weakness at the point at which its ends are welded. Preferably, the elementary filaments are distributed homogeneously throughout the volume of the torus.

In another variant, the core forms a winding of the yarn in a number of coils.

In another embodiment, the core comprises a plurality of separate yarns. On account of the presence of the organic matrix, the core material has a greater capability of elastic deformation, which is enhanced by the plurality of yarns. Specifically, by increasing the number of yarns and for a predetermined size of the bead wire, the cross section of each yarn, and thus the stiffness of the cross section of each yarn, is reduced and the critical bending radius of curvature of the core is decreased.

The combination of firstly the core material and secondly the plurality of yarns makes it possible to obtain a bead wire having an excellent capability of elastic deformation. Any risk of plasticization of the bead wire is avoided and thus any scrapping associated with this plasticization is dispensed with.

In one variant, the yarns are assembled by cabling. In this variant, the yarns are wound together in a helix and do not undergo a twist about their own axis.

In another variant, the yarns are assembled by twisting. In this variant, the yarns are wound together in a helix and undergo both a collective twist and an individual twist about their own axis, thereby generating an untwisting torque on each of the yarns.

In yet another variant, the core comprises a plurality of monolithic toruses that are juxtaposed parallel to one another. Advantageously, the ratio of the contribution of the core to the mass of the bead wire to the contribution of the core to the force at break of the bead wire is strictly less than 1, preferably less than or equal to 0.8 and more preferably less than or equal to 0.7. For a relatively low mass of the core, the force at break of the core is relatively high. Thus, a relatively small increase in the mass of the core, and thus of the bead wire, brings about a relatively high increase in the force at break.

The contribution of the core to the force at break is defined by the ratio of the force at break of the core alone to the force at break of the bead wire. The contribution of the core to the mass of the bead wire is defined by the ratio of the mass of the core alone to the mass of the bead wire. In order to determine the ratio of contribution to the force at break, the force at break of the bead wire or of the core (maximum load in N) can be measured by any kind of method that is generally used. Use could be made for example of a method in accordance with the standard ISO 6892, 1984 on a rectilinear specimen of the bead wire, or even a method in accordance with the bead wire tensile test described below.

Advantageously, the ratio of the contribution of the core to the mass of the bead wire to the contribution of the core to the force at break of the bead wire is greater than or equal to 0.25, preferably greater than or equal to 0.4 and more preferably greater than or equal to 0.5. Thus, the bead wire has an excellent distribution of the contributions to the mass and to the force at break between the core and the layers.

Preferably, the ratio of the contribution of the core to the mass of the bead wire to the contribution of the core to the force at break of the bead wire is in at least one of the ranges [0.25; 1], [0.4; 1], [0.5; 1], [0.25; 0.8], [0.4; 0.8], [0.5; 0.8], [0.25; 0.7], [0.4; 0.7] and [0.5; 0.7].

More preferably, the ratio of the contribution of the core to the mass of the bead wire to the contribution of the core to the force at break of the bead wire is in the range [0.5; 0.7].

Advantageously, the material of which each yarn is made has a yield strength measured in accordance with the standard ISO 14125 at 23° C. greater than or equal to 800 MPa, preferably greater than or equal to 1000 MPa and more preferably greater than or equal to 1200 MPa. By virtue of the high yield strength of the core material, the risk of plasticization of the bead wire during the steps of transport, storage, fitting and removal is reduced.

Advantageously, the material of which each yarn is made has a Young's modulus measured in accordance with the standard ISO 14125 at 23° C. less than or equal to 100 GPa, preferably less than or equal to 75 GPa and more preferably less than or equal to 50 GPa. The low Young's modulus makes it possible to obtain a core that is strong in terms of deformation.

Preferably, the combination of the high yield strength and the low Young's modulus gives the core of the bead wire an excellent capability of deformation in the elastic domain.

Preferably, the contribution of the core to the force at break of the bead wire is greater than or equal to 5%, preferably greater than or equal to 15% and more preferably greater than or equal to 40%. Thus, the contribution of the core of the bead wire to the force at break of the bead wire is greater than the contribution of the core of the prior art bead wire to the force at break of the prior art bead wire.

Optionally, the contribution of the core to the force at break of the bead wire is less than or equal to 75%. The contribution to the force at break thus remains relatively well distributed between the core and the layers.

Preferably, the contribution of the core to the mass of the bead wire is greater than or equal to 7%, preferably greater than or equal to 15% and more preferably greater than or equal to 25%. Thus, the contribution of the core of the bead wire to the mass of the bead wire is greater than or equal to the contribution of the core of the prior art bead wire to the mass of the prior art bead wire.

Optionally, the contribution of the core to the mass of the bead wire is less than or equal to 75%. The contribution to the mass thus remains relatively well distributed between the core and the layers.

Optionally, all of the wires of the intermediate and outer layers have a substantially identical diameter. Thus, it is relatively easy to manufacture the bead wire.

Advantageously, the ratio of the diameter of the torus defined by the core to the diameter of the torus defined by the bead wire is greater than or equal to 0.25, preferably greater than or equal to 0.4 and more preferably greater than or equal to 0.6. Thus, it is possible to obtain bead wires comprising few layers and having excellent mechanical properties, in particular force at break.

Preferably, the force at break of the bead wire is greater than or equal to 200 kN, preferably greater than or equal to 260 kN and more preferably greater than or equal to 320 kN. The force at break of the bead wire or of the core (maximum load in N) is measured at 23° C., preferably using a circumferential tensile test, referred to as the bead wire tensile test, on a tensile testing machine comprising twelve radially mobile sectors. During this test, which is carried out under quasi-static conditions, the bead wire or core to be tested is positioned around the sectors. The simultaneous and progressive movement of the sectors has the effect of exerting a radial force of increasing intensity on the bead wire or core. The movements of the sectors are followed by three force sensors that measure the forces exerted on the bead wire or core. The force at break is determined when an element of the bead wire breaks (in the case of the test on the bead wire) or when the core breaks (in the case of the test on the core). The acquisition frequency is equal to 100 Hz. The force at break value that is retained is the average of the three values measured by the three sensors.

According to preferred features of the bead wire:
The diameter of each yarn is between 6 and 20 mm.
The diameter of each elementary filament of each multifilament textile fibre is between 2 and 30 μm.
Each multifilament textile fibre is continuous. The term "continuous", in opposition to discontinuous, is understood as meaning that for a predetermined length of the fibre, for example 5 cm, at least 80% and preferably at least 90% of the elementary filaments of the fibre are individually continuous.
Each multifilament textile fibre comprises more than 10 elementary filaments, preferably more than 100 elementary filaments and more preferably more than 1000 elementary filaments.

Advantageously, the extension and bending moduli of the core material of the bead wire that are measured in accordance with the standards ASTM D 638 and ASTM D 790, respectively, at 23° C. are preferably greater than 15 GPa, more preferably greater than 30 GPa, in particular between 30 and 50 GPa, inclusive.

Preferably, the extension modulus of the organic core matrix that is measured in accordance with the standard ASTM D 638 at 23° C. is greater than or equal to 2.3 GPa, preferably greater than or equal to 2.5 GPa and more preferably greater than or equal to 3 GPa.

Optionally, the core material has elastic deformation in compression at least equal to 2%, preferably to 3%. Preferably, the core material has, in flexion, a breaking stress in compression greater than its breaking stress in extension.

The mechanical bending properties of the core material are measured with the aid of a tensile testing machine of the type 4466 from the company Instron.

The compressive properties are measured on the core material by the method referred to as the loop test (D. Sinclair, *J. App. Phys.* 21, 380 (1950)). In the present use of this test, a loop is produced and is brought progressively to its breaking point. The nature of the break, which is easily observable on account of the large size of the cross section, makes it immediately possible to recognize the breaking of the core material in extension or in compression.

Preferably, it will be noted that the core material, loaded in bending until it breaks, breaks on the side where the material is in extension, this being identified by simple visual observation.

Given that in this case the dimensions of the loop are large, it is possible at any time to read the radius of the circle inscribed in the loop. The radius of the circle inscribed just before the breaking point corresponds to the critical radius of curvature. It is denoted Rac. The following formula then makes it possible to determine by calculation the critical elastic deformation: $ecr=r/(Rac+r)$, where r corresponds to the radius of the material.

The breaking stress in compression is obtained by calculation using the following formula: $\sigma c=ecr.Me$, where Me is the extension modulus.

Since, in the case of the core material, the loop breaks in the part in extension, the conclusion is drawn that, in flexion, the breaking stress in compression is greater than the breaking stress in extension.

Breaking in flexion of a rectangular bar by the method referred to as the three failures method is also carried out. This method corresponds to the standard ASTM D 790. This method also makes it possible to verify, visually, that the nature of the break is indeed in extension.

The glass transition temperature Tg of the organic core matrix is preferably greater than 130° C., more preferably greater than 140° C. The glass transition temperature is measured in accordance with the standard ASTM D 3418.

The fibre content of the core material is advantageously between 30% and 80%, inclusive, of the overall mass of the material. Preferably, the fibre content is between 50% and 80%, inclusive, of the mass of the core material. The content by mass of fibres, expressed in percent, is calculated by dividing the mass of 1 m of fibres, obtained from the titre, by the linear density of the core material.

Advantageously, the density of the core material is less than or equal to 2.2, preferably less than or equal to 2.05 and more preferably less than or equal to 1.6. Preferably, the density of the core material is between 1.4 and 2.05, inclusive, in which range the material has the best compromise between mass and mechanical properties, in particular the force at break. The density of the core material is measured by means of a specialist balance of the type PG503 DeltaRange from the company Mettler Toledo. Specimens of a few centimeters are successively weighed in air and dipped into methanol; the software of the apparatus then determines the density; the density is the average of three measurements.

Preferably, all of the metal wires are made of the same metal. As a variant, at least two metal wires are made of two different metals.

Preferably, at least one wire of one layer is made of steel. Advantageously, the wires of all the layers are made of steel.

Advantageously, the carbon content of the steel, in weight, is greater than or equal to 0.7%, preferably greater than or equal to 0.8% and more preferably greater than or equal to 0.9%.

Such carbon contents represent a good compromise between the required mechanical properties and the feasibility of the wires. In particular, in the case of a carbon content greater than or equal to 0.9%, it is possible to obtain excellent mechanical properties, in particular force at break.

The metal or the steel used, whether it is in particular a carbon steel or a stainless steel, may itself be coated with a metal layer which improves, for example, the workability of the metal cord and/or of its constituent elements, or the use properties of the cord and/or of the tyre themselves, such as properties of adhesion, corrosion resistance or resistance to ageing.

According to one preferred embodiment, the steel used is covered with a layer of brass (Zn—Cu alloy) or of zinc. It will be recalled that, during the process of manufacturing the wires, the brass or zinc coating makes the wire easier to draw, and makes the wire adhere to the rubber better. However, the wires could be covered with a thin layer of metal other than brass or zinc having, for example, the function of improving the corrosion resistance of these wires and/or their adhesion to the rubber, for example a thin layer of Co, Ni, Al, of an alloy of two or more of the compounds Cu, Zn, Al, Ni, Co, Sn.

A person skilled in the art will know how to manufacture steel wires, by adjusting in particular the composition of the steel and the final degree of work hardening of these wires, depending on its particular specific requirements, by using for example micro-alloyed carbon steels containing specific addition elements such as Cr, Ni, Co, V or various other known elements (see for example *Research Disclosure 34984—"Micro-alloyed steel cord constructions for tyres"*—May 1993; *Research* Disclosure 34054—*"High tensile strength steel cord constructions for tyres"*—August 1992).

A further subject of the invention is a tyre comprising at least one bead wire as defined above.

Preferably, the tyre is for an aircraft. Given the high number of tyres on an aircraft, which may reach more than twenty units, the reduction in mass of each tyre allows a relatively significant reduction in the overall mass of the aircraft.

As a variant, the tyre is for a ground vehicle. A ground vehicle is understood to be any vehicle apart from aircraft.

BRIEF DESCRIPTION OF THE DRAWINGS

The invention will be better understood on reading the following description, which is given solely by way of nonlimiting example, with reference to the drawings in which.

DETAILED DESCRIPTION OF EMBODIMENTS OF THE INVENTION

Figure 1:
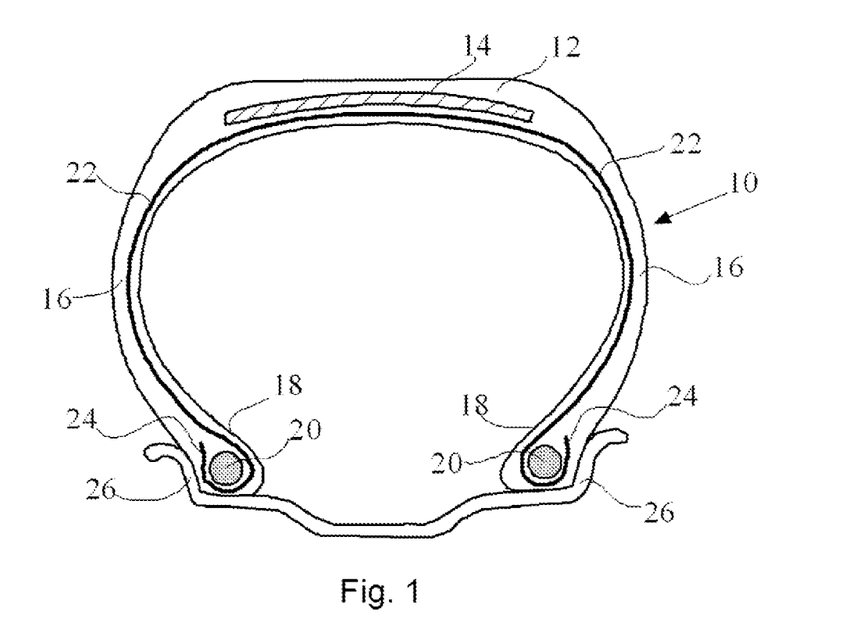
FIG. 1 is a perspective view of a tyre according to the invention.

FIG. 1 shows a tyre according to the invention, denoted by the general reference 10. In this case, the tyre 10 is intended to be fitted on an aircraft and has dimensions of 46×17 R20. As a variant, the tyre 10 is intended to be fitted on a terrestrial vehicle, for example a vehicle of the heavy goods vehicle type.

The tyre 10 has a crown 12 reinforced by a crown reinforcement 14, two sidewalls 16 and two beads 18, each of these beads 18 being reinforced with an annular bead wire 20. The crown 14 is surmounted by a tread, not shown in this schematic figure. A carcass reinforcement 22 is wound around the two bead wires 20 in each bead 18 and comprises a turn-up 24 disposed towards the outside of the tyre 20, which is shown fitted onto a wheel rim 26 here. The carcass reinforcement 22 is made up of at least one ply reinforced with cords. The reinforcement 22 is of the radial type. As a variant, the reinforcement 22 is made up of at least two plies reinforced with cords and is of the bias belted type.

Each bead wire 20 has a toroidal overall shape and has an approximately circular cross section. As a variant, the bead wire 20 has a polygonal, for example square, rectangular or hexagonal cross section or even an elliptical or oblong cross section.

Figure 2:
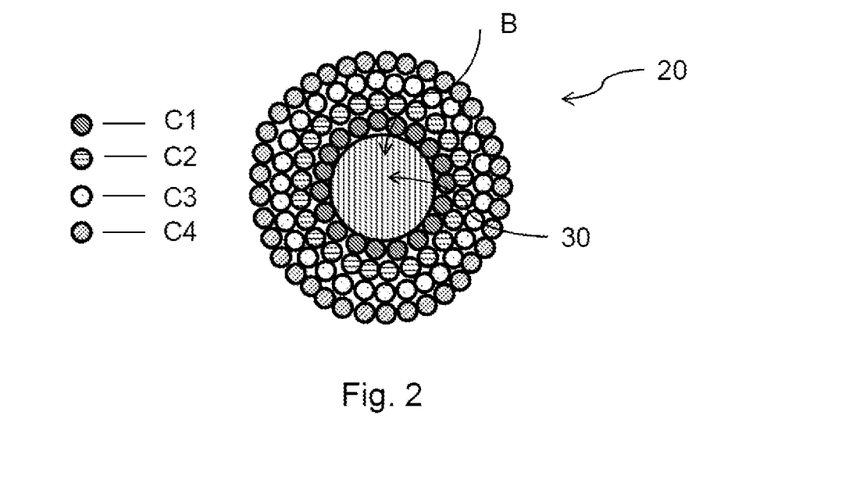
FIGS. 2 and 3 are views in section perpendicular to the axis of the bead wire (which is assumed to be straight and at rest) of bead wires according to the first and second embodiments, respectively, of the invention.

FIG. 2 shows a bead wire 20 according to a first embodiment of the invention.

The bead wire 20 comprises a core 30 and four layers C1, C2, C3, C4. The diameter Dt of the torus defined by the bead wire 20 is equal to 21.3 mm. The bead wire 20 is of the multilayer type.

The core 30 comprises a single yarn and in this case consists of a single yarn B. The diameter of the yarn B is between 6 and 20 mm, preferably between 6 and 10 mm.

The yarn B forms a monolithic torus. The core 30 has an approximately circular cross section and the diameter Da of the torus defined by the core 30 is equal to 8.90 mm. The core 30 is made of a core material Ma and comprises a multifilament textile fibre embedded in an organic matrix. The multifilament textile fibre is a glass fibre and the organic core matrix is a thermoset resin. The multifilament textile fibre is continuous. As a variant, the textile fibre is discontinuous.

The glass fibre comprises more than 10 elementary glass filaments, preferably more than 100 and more preferably more than 1000 elementary filaments arranged side by side and thus more or less parallel to one another, apart from the occasional overlap. The diameter of each elementary filament of the textile fibre is between 2 and 30 µm. The glass fibre used may be of the "E" or "R" type.

The thermoset resin is of the vinyl ester type. Without this definition being limiting, the vinyl ester resin is preferably of the epoxy vinyl ester type. Use is more preferably made of a vinyl ester resin, in particular of the epoxy type, which, at least in part, is based on novolac (also known as phenoplast) and/or bisphenol (that is to say is grafted onto a structure of this type), or preferably a vinyl ester resin based on novolac, bisphenol, or novolac and bisphenol, as described for example in applications EP 1 074 369 and EP 1 174 250. An epoxy vinyl ester resin of the novolac and bisphenol type has shown excellent results; by way of examples, the vinyl ester resins "ATLAC 590" or "ATLAC E-Nova FW 2045" from the company DSM (both diluted with styrene) may be mentioned in particular. Such epoxy vinyl ester resins are available from other manufactures, such as Reichhold, Cray Valley, UCB.

The core 30 is manufactured for example by impregnation of the fibre as described in document U.S. Pat. No. 3,730, 678, or by injection of the organic matrix into a mould in which the fibre has previously been placed, or as described in document EP1167080.

Each layer C1 to C4 comprises a metal wire wound in a helix around the core 30. The wire of the intermediate layer C1 is wound in contact with the core 30. Each wire of each intermediate layer C2, C3 is wound in contact with the layer C1, C2, respectively. The wire of the outer layer C4 is wound in contact with the layer C3. The two ends of each wire of each layer C1 to C4 are connected by means of sleeves.

All of the wires have a more or less identical diameter Df equal to 1.55 mm. Each wire is made of a steel of which the carbon content is greater than or equal to 0.7% by weight of the steel, preferably greater than or equal to 0.8% and more preferably greater than or equal to 0.9%, in this case equal to 0.9%. Each wire of each layer C1 to C4 is wound over a number of turns, for example over 19, 25, 31 and 37 turns, respectively, such that each layer is saturated, that is to say there is not enough room between adjacent windings to be able to insert an additional winding.

Figure 3:
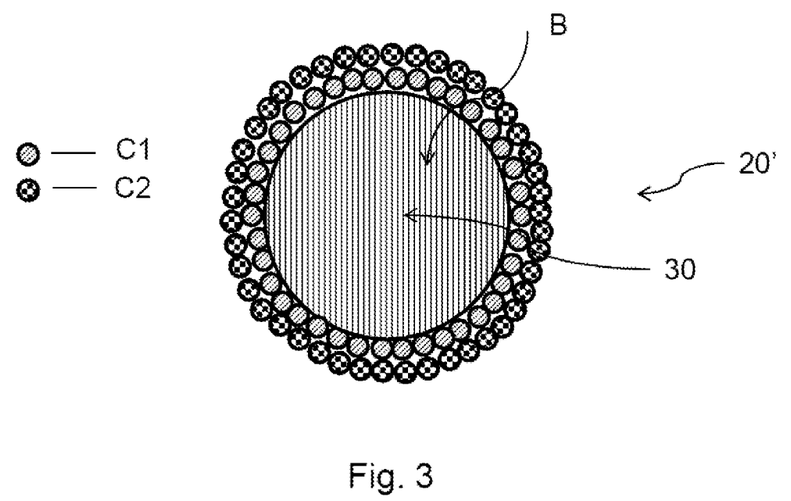

FIG. 3 shows a bead wire 20' according to a second embodiment of the invention. Elements similar to those shown with reference to the previous embodiment are denoted by identical references.

In contrast to the bead wire according to the first embodiment, the bead wire 20' according to the second embodiment comprises an intermediate layer C1 and an outer layer C2. The wire of each layer C1, C2 is wound over a number of turns, over 38 and 44 turns, respectively. Thus, the diameter Dt of the torus defined by the bead wire 20' is equal to 21.3 mm. The diameter Da of the torus defined by the core 30 is equal to 16 mm. Each wire has a diameter Df equal to 1.3 mm.

In a third embodiment (not illustrated), the core 30 forms a winding having a number of coils. In this case, the core 30 comprises a number of coils of a single yarn B. These coils have an axis in common with that of the bead wire 20. Thus, each coil has a circular overall shape in projection in a plane perpendicular to the axis of the bead wire.

Traverse winding of the yarn B over a number of turns is carried out such that the core 30 has a substantially polygonal, in this case triangular, cross section. The yarn B is made of the core material Ma described in the previous embodiments. The diameter of each coil B is between 2.5 and 10 mm, preferably between 2.5 and 4 mm.

In a fourth embodiment (not illustrated), the core 30 comprises a plurality of separate yarns B1, B2, B3. Each yarn B1, B2, B3 forms a monolithic torus of which the axis is in common with that of the bead wire 20. The core 30 thus comprises a plurality of monolithic toruses that are juxtaposed parallel to one another. The toruses are side by side such that the core 30 has a substantially polygonal, in this case triangular, cross section.

All of the yarns B1, B2, B3 are made of the same core material. For example, the yarns B1, B2, B3 are made of the material Ma of the yarn B. As a variant, the yarns B1, B2, B3 are made of at least two different core materials, each of the materials comprising at least one multifilament textile fibre embedded in an organic matrix. The diameter of each yarn B1, B2, B3 is between 2.5 and 10 mm, preferably between 2.5 and 4 mm.

The tyre 10 illustrated in FIG. 1 comprises two bead wires 20 according to the first embodiment. A similar tyre 10' according to a second embodiment (not shown) comprises two bead wires 20' according to the second embodiment.

Figure 4:
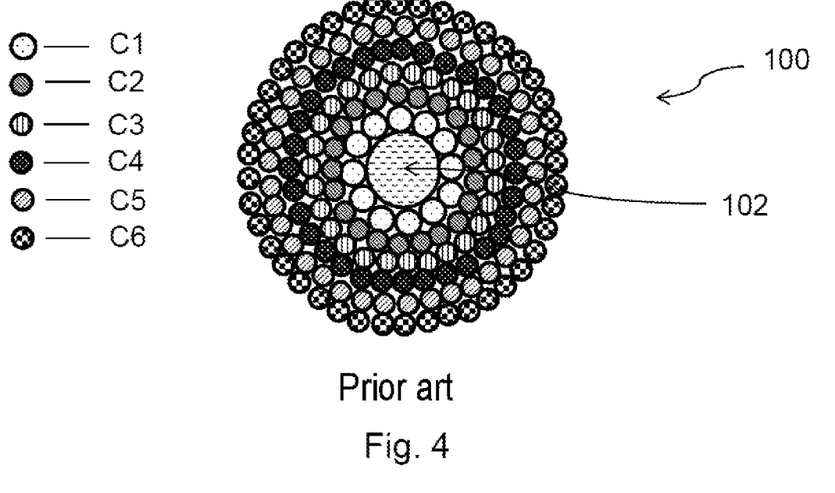
FIG. 4 is a view in section perpendicular to the axis of the bead wire (which is assumed to be straight and at rest) of a prior art bead wire.

FIG. 4 shows a prior art bead wire denoted by the general reference 100.

In contrast to the bead wire according to the invention, the bead wire 100 comprises a metal core 102 made of a steel having a carbon content equal to 0.1%. The diameter Da of the torus defined by the core 102 is equal to 5 mm.

The bead wire 100 comprises six layers C1 to C6, namely five intermediate layers C1 to C5 and an outer layer C6. The wire of the intermediate layer C1 has a diameter equal to 1.55 mm and each wire of each intermediate layer C2 to C5 and outer layer C6 has a diameter equal to 1.3 mm. Each wire of each layer C1 to C6 is made of steel having a carbon content equal to 0.7%. The diameter of the torus Dt defined by the bead wire 100 is equal to 21.3 mm.

Comparative Measurements

The bead wires 20, 20' according to the first and second embodiments and the prior art bead wire 100 were compared. The tyres 10, 10' according to the first and second embodiments and a prior art tyre comprising two prior art bead wires 100 were also compared.

Residual force at break measurements were carried out following low-speed running. The tyre comprising the bead wire is mounted on landing gear of a predetermined aeroplane and the latter "taxis", simulating the phases prior to takeoff and following landing of the aeroplane. The "taxiing" is carried out under predetermined high loads and for a predetermined time. Next, the bead wire is removed from the tyre and the force at break under tension is measured according to the bead wire tensile test described above. The force at break thus measured is the residual force at break, denoted Fmr. When the relative unit is greater than 1, the bead wire tested has lost, proportionately to its initial force at break, less force at break than the bead wire 100. Conversely, when the relative unit is less than 1, the bead wire tested has lost, proportionately to its initial force at break, more force at break than the bead wire 100.

The characteristics resulting from the measurements carried out are summarized in Table 1 below.

TABLE 1

| Bead wire tested | Bead wire 100 | Bead wire 20 | Bead wire 20' |
|---|---|---|---|
| Mass | 3.6 kg | 3 kg | 2.2 kg |
| Force at break (Fm) | 320 kN | >320 kN | 300 kN |
| Burst pressure | >61 bar | >61 bar | >61 bar |
| Residual force at break (Fmr) as relative unit | 1 | 1 | 1 |
| Yield strength of the core material (Re) | 700 MPa | >1000 MPa | >1000 MPa |
| Young's modulus (E) | 205 GPa | 40 GPa | 40 GPa |
| Diameter of the bead wire (Dt) | 21.3 mm | 21.3 mm | 21.3 mm |
| Diameter of the core (Da) | 5 mm | 8.9 mm | 16 mm |
| Rd = Da/Dt | 0.23 | 0.42 | 0.75 |
| Contribution of the core to the force at break of the bead wire (Rf) | 2% | 13% | 45% |
| Contribution of the core to the mass of the bead wire (Rm) | 7% | 7% | 28% |
| R = Rm/Rf | 3.5 | 0.54 | 0.62 |

The bead wires 20, 20' make it possible, at constant diameter, to maintain excellent mechanical characteristics, in particular force at break, while reducing the mass of the prior art bead wire by 17% (first embodiment) and 39% (second embodiment).

Furthermore, each tyre 10, 10' has a burst strength identical to the prior art tyre. The residual force at break Fmr of each bead wire 20, 20' is identical to that of the bead wire 100, that is to say that the bead wire tested has lost, proportionately to its initial force at break, as much force at break as the bead wire 100.

The force at break Fm of each bead wire 20, 20' is greater than or equal to 200 kN, preferably greater than or equal to 260 kN for the second embodiment and more preferably greater than or equal to 320 kN for the first embodiment. Thus, with a mass much less than that of the bead wire 100, each bead wire 20, 20' has a force at break that is more or less equivalent (second embodiment) or even greater (first embodiment).

The core material of each bead wire 20, 20' has a yield strength Re measured in accordance with the standard ISO 14125 at 23° C. greater than or equal to 800 MPa, preferably greater than or equal to 1000 MPa and more preferably greater than or equal to 1200 MPa.

The core material Ma of each bead wire 20, 20' has a Young's modulus E measured in accordance with the standard ISO 14125 at 23° C. less than or equal to 100 GPa, preferably less than or equal to 75 GPa and more preferably less than or equal to 50 GPa.

The ratio Rd of the diameter Da of the torus defined by the core 30 to the diameter Dt of the torus defined by each bead wire 20, 20' is greater than or equal to 0.25, preferably greater than or equal to 0.4 for the first embodiment and more preferably greater than or equal to 0.6 for the second embodiment.

The contribution Rf of the core 30 to the force at break Fm of the bead wire 20 is greater than or equal to 5% for the first embodiment, preferably greater than or equal to 15% and more preferably greater than or equal to 40% for the second embodiment. This contribution Rf is less than or equal to 75% for each bead wire 20, 20'.

At an equal contribution of the core to the mass of the bead wire, the core of each bead wire 20, 20' has a much greater contribution to the force at break of the bead wire, i.e. around 7 times greater than that of the bead wire 100.

The contribution of the core to the force at break is multiplied by 22 when going from the bead wire 100 to the bead wire 20 according to the second embodiment, while the contribution of the core to the mass of the bead wire is only multiplied by 4.

The contribution Rm of the core 30 to the mass of the bead wire 20 is greater than or equal to 7% for the first embodiment, preferably greater than or equal to 15% and more preferably greater than or equal to 25% for the second embodiment. This contribution Rm is less than or equal to 75% for the bead wires 20, 20'.

The ratio R of the contribution Rm to the contribution Rf is strictly less than 1, preferably less than or equal to 0.8 and more preferably less than or equal to 0.7 for the bead wires 20, 20'. This ratio R is greater than or equal to 0.25, preferably greater than or equal to 0.4 and more preferably greater than or equal to 0.5. Thus, R lies in the range [0.5; 0.7] for the bead wires 20, 20'.

The invention is not limited to the embodiments described above.

Specifically, the bead wire according to the invention can be fitted on a tyre other than a tyre for an aircraft. For example, the bead wire may be intended for a tyre for industrial vehicles chosen from vans, heavy vehicles—i.e. metro vehicles, buses, road transport vehicles (lorries, tractors, trailers), off-road vehicles—, agricultural or construction plant machinery, and other transport or handling vehicles.

In one embodiment, the core comprises a plurality of separate yarns that are assembled by cabling or twisting.

Moreover, the characteristics of the different embodiments can be combined with one another in any way, as long as they are compatible with one another.

It will be noted that it is possible to use a bead wire for a tyre, comprising:
a core,
at least one outer layer comprising an outer-layer wire wound around the core,
at least one intermediate layer comprising an intermediate-layer wire wound around the core, said intermediate layer being disposed between the core and the outer layer,
wherein the ratio of the contribution of the core to the mass of the bead wire to the contribution of the core to the force at break of the bead wire is strictly less than 1, preferably less than or equal to 0.8 and more preferably less than or equal to 0.7, independently of the fact that the bead wire comprises:
a core comprising at least one yarn of a multifilament textile fibre embedded in an organic matrix,
at least one outer layer comprising an outer-layer metal wire wound around the core,
at least one intermediate layer comprising an intermediate-layer metal wire wound around the core, said intermediate layer being disposed between the core and the outer layer.

The invention claimed is:

1. A bead wire for a tyre, the bead wire comprising:
a core that includes a single yarn of a multifilament textile fibre embedded in an organic matrix, the multifilament textile fibre including a plurality of elementary filaments;
an outer layer including an outer-layer metal wire wound around the core; and
at least one intermediate layer, each intermediate layer including an intermediate-layer metal wire wound around the core,
wherein the core forms a monolithic torus having no macroscopic joint corresponding to a joining of ends to form the torus,
wherein the multifilament textile fibre is embedded in the organic matrix such that the elementary filaments are positioned side by side, and
wherein each intermediate layer is disposed between the core and the outer layer.

2. The bead wire according to claim 1, wherein a ratio of a contribution of the core to a mass of the bead wire to a contribution of the core to a force at break of the bead wire is less than 1.

3. The bead wire according to claim 2, wherein the ratio of the contribution of the core to the mass of the bead wire to the contribution of the core to the force at break of the bead wire is greater than or equal to 0.25.

4. The bead wire according to claim 1, wherein a material of which the yarn is made has a yield strength greater than or equal to 800 MPa, measured in accordance with a standard ISO 14125 at 23° C.

5. The bead wire according to claim 1, wherein a material of which the yarn is made has a Young's modulus less than or equal to 100 GPa, measured in accordance with the standard ISO 14125 at 23° C.

6. The bead wire according to claim 1, wherein a contribution of the core to a force at break of the bead wire is greater than or equal to 5%.

7. The bead wire according to claim 6, wherein the contribution of the core to the force at break of the bead wire is less than or equal to 75%.

8. The bead wire according to claim 1, wherein a contribution of the core to a mass of the bead wire is greater than or equal to 7%.

9. The bead wire according to claim 8, wherein the contribution of the core to the mass of the bead wire is less than or equal to 75%.

10. The bead wire according to claim 1, wherein a ratio of a diameter of a torus defined by the core to a diameter of a torus defined by the bead wire is greater than or equal to 0.25.

11. The bead wire according to claim 1, wherein a force at break of the bead wire is greater than or equal to 200 kN.

12. The bead wire according to claim 1, wherein a diameter of the yarn is between 6 and 20 mm.

13. The bead wire according to claim 1, wherein a diameter of each elementary filament is between 2 and 30 μm.

14. The bead wire according to claim 1, wherein the multifilament textile fibre includes more than 10 elementary filaments.

15. The bead wire according to claim 1, wherein the multifilament textile fibre is chosen from a group of fibres consisting of: glass fibres, carbon fibres, silica fibres, ceramic fibres, and mixtures thereof.

16. The bead wire according to claim 1, wherein the organic matrix is a thermoset type of matrix.

17. A tyre comprising at least one bead wire, each bead wire including:
a core that includes a single yarn of a multifilament textile fibre embedded in an organic matrix, the multifilament textile fibre including a plurality of elementary filaments;
an outer layer including an outer-layer metal wire wound around the core; and
at least one intermediate layer, each intermediate layer including an intermediate-layer metal wire wound around the core,
wherein the core forms a monolithic torus having no macroscopic joint corresponding to a joining of ends to form the torus,
wherein the multifilament textile fibre is embedded in the organic matrix such that the elementary filaments are positioned side by side, and
wherein each intermediate layer is disposed between the core and the outer layer.

18. The tyre according to the claim 17, wherein the tyre is an aircraft tyre.

* * * * *

UNITED STATES PATENT AND TRADEMARK OFFICE
CERTIFICATE OF CORRECTION

PATENT NO. : 9,902,212 B2
APPLICATION NO. : 14/405020
DATED : February 27, 2018
INVENTOR(S) : Laurent Bucher Page 1 of 1

It is certified that error appears in the above-identified patent and that said Letters Patent is hereby corrected as shown below:

In the Specification

At Column 6, Line 42, "Disclosure" should be --*Disclosure*--.

In the Claims

At Column 12, Line 59, "the claim" should read --claim--.

Signed and Sealed this
Fifteenth Day of May, 2018

Andrei Iancu
*Director of the United States Patent and Trademark Office*